(12) United States Patent
Takagi

(10) Patent No.: US 10,532,531 B2
(45) Date of Patent: Jan. 14, 2020

(54) DEVICE FOR WINDING BEAD RING-BINDING THREAD

(75) Inventor: Chikara Takagi, Hashima (JP)

(73) Assignees: FUJI SEIKO CO., LTD (JP); FUJI SHOJI CO., LTD. (JP)

( * ) Notice: Subject to any disclaimer, the term of this patent is extended or adjusted under 35 U.S.C. 154(b) by 251 days.

(21) Appl. No.: 14/408,502

(22) PCT Filed: Jun. 20, 2012

(86) PCT No.: PCT/JP2012/065772
§ 371 (c)(1),
(2), (4) Date: Dec. 16, 2014

(87) PCT Pub. No.: WO2013/190667
PCT Pub. Date: Dec. 27, 2013

(65) Prior Publication Data
US 2015/0251369 A1  Sep. 10, 2015

(51) Int. Cl.
*B29D 30/48* (2006.01)
*B21F 37/00* (2006.01)

(52) U.S. Cl.
CPC ............. *B29D 30/48* (2013.01); *B21F 37/00* (2013.01); *B29D 2030/487* (2013.01); *B29D 2030/488* (2013.01)

(58) Field of Classification Search
CPC ................... B29D 30/48; B29D 30/50; B29D 2030/0044; B29D 2030/482;
(Continued)

(56) References Cited

U.S. PATENT DOCUMENTS 3,718,523 A * 2/1973 Mallory ................. B29D 30/50
156/172
4,234,370 A * 11/1980 McDonough .......... B29D 30/68
156/128.6
(Continued)

FOREIGN PATENT DOCUMENTS

EP  0032736 A2 *  7/1981 ............. B29D 30/48
JP  59138016 A *  8/1984
(Continued)

OTHER PUBLICATIONS

Machine generated English language translation of JP 2004-345537 (original document dated Dec. 2004).*
(Continued)

*Primary Examiner* — Robert C Dye
*Assistant Examiner* — Sedef E Paquette
(74) *Attorney, Agent, or Firm* — Tarolli, Sundheim, Covell & Tummino LLP

(57) ABSTRACT

A bead ring bonding cord winding apparatus includes a feed roller that feeds a bead ring, which is formed by winding a wire a multiple number of times, in a circumferential direction of the bead ring, a gripping member that grips an initiating end of a bonding cord, and a rotation member that rotates past an inner side and an outer side of the bead ring while holding the bonding cord. In the bead ring bonding cord winding apparatus, while the bead ring is fed in the circumferential direction, the rotation member is rotated past the inner side and the outer side of the bead ring to spirally wind the bonding cord around the bead ring. The gripping member is located at an upstream side of the rotation member in the feeding direction of the bead ring.

1 Claim, 5 Drawing Sheets

(58) Field of Classification Search
CPC ........ B29D 2030/483; B29D 2030/487; B29D 2030/488; B29D 30/1621; B65H 65/00; B65H 81/02; B65H 81/04; B65H 54/343; B21F 37/00; B29C 53/562
USPC .......... 156/136, 422, 460; 245/1.5; 242/165, 242/476.3
See application file for complete search history.

(56) References Cited

U.S. PATENT DOCUMENTS

| | | | |
|---|---|---|---|
| 5,616,209 A | 4/1997 | Laurent et al. | |
| 6,363,988 B1 * | 4/2002 | Yasufuku | B29D 30/48 156/396 |

FOREIGN PATENT DOCUMENTS

| | | | | |
|---|---|---|---|---|
| JP | 01-205816 | * | 8/1989 | ............. B21C 47/12 |
| JP | 2000-136068 | | 5/2000 | |
| JP | 2000-355056 | | 12/2000 | |
| JP | 2004-345537 | | 12/2004 | |
| JP | 20043-45537 | * | 12/2004 | ............. B60C 5/04 |
| JP | 2004345537 A | | 12/2004 | |
| RU | 2139192 C1 | | 10/1999 | |
| WO | WO-2011030764 A1 | * | 3/2011 | ............. B29D 30/48 |

OTHER PUBLICATIONS

Machine generated English language translation of JP 01-205816 (origial document dated Aug. 1989).*
Nomura Shigeaki, WO 2011030764, machine translation. (Year: 2011).*
Tsutomu Takagi, JP 2004345537, machine translation. (Year: 2004).*
Tatai Ilona DR Dipl-Chem, EP-0032736-A2 machine translation. (Year: 1981).*
Tokyo Shibaura Denki, JP 59138016 A machine translation. (Year: 1984).*
Search Report for Application No. RU 2015101066 dated Apr. 4, 2016.
International Search Report for corresponding PCT/JP2012/065772, completed Sep. 11, 2012 in the JPO.
International Preliminary Report on Patentability for PCT/JP2012/065772, dated Sep. 25, 2012, pp. 1-6.

* cited by examiner

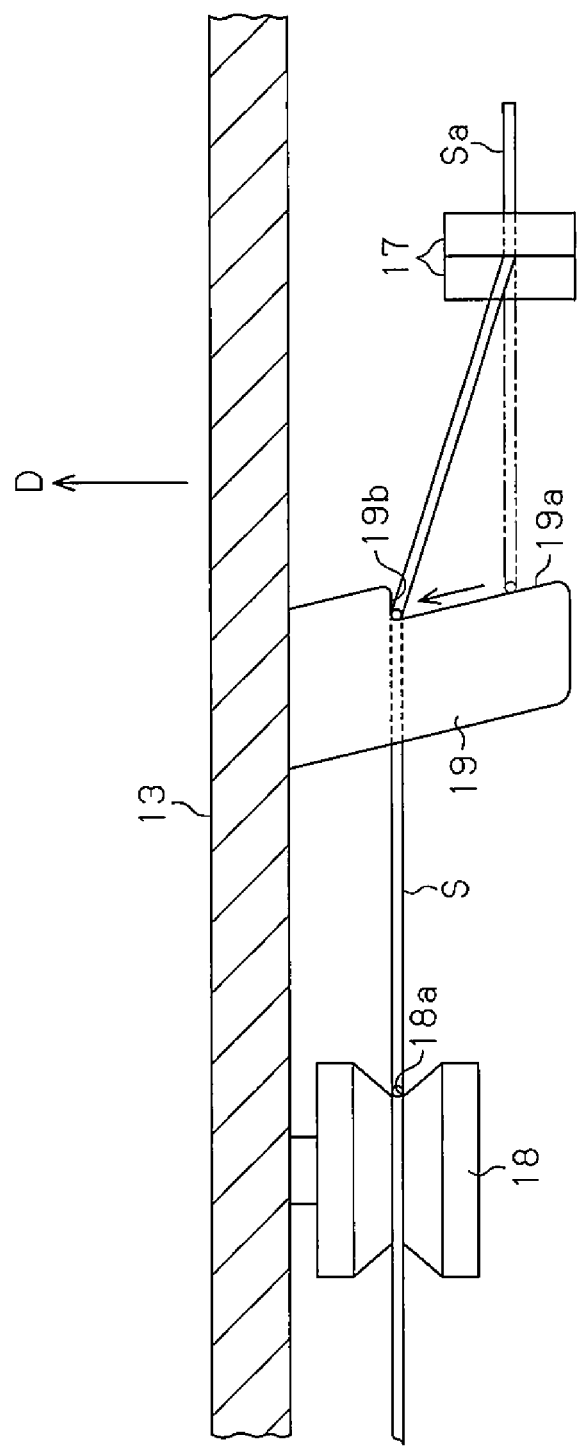

DEVICE FOR WINDING BEAD RING-BINDING THREAD

RELATED APPLICATIONS

The present invention is a U.S. National Stage under 35 USC 371 patent application, claiming priority to Serial No. PCT/JP2012/065772, filed on 20 Jun. 2012, the entirety of which is incorporated herein by reference.

TECHNICAL FIELD

The present invention relates to a bead ring bonding cord winding apparatus that winds a bonding cord around a bead ring in order to bond a winding initiating end and a winding terminating end of a wire when the bead ring is manufactured by winding the wire a multiple number of times.

BACKGROUND ART

Patent Document 1 describes a prior art example of a bead ring bonding cord winding apparatus. The bead ring bonding cord winding apparatus includes a feed roller and a rotor. The feed roller feeds an annular bead ring, which is formed by winding a wire, in a circumferential direction. The rotor rotates past an inner side and an outer side of the bead ring. A guide roller is arranged on the rotor to guide a bonding cord. A holder is located beside the rotor to hold the initiating end of the bonding cord in a releasable manner. The holder is movable toward and away from a location proximate to the rotation center of the rotor.

When the holder holding the initiating end of the bonding cord is located near the rotation center of the rotor, the rotor is rotated and the bead ring is fed in the circumferential direction by the feed roller. As a result, the bonding cord, which is guided by the guide roller on the roller, is spirally wound around the bead ring and bonds the winding initiating end and the winding terminating end so that unwinding does not occur.

In the bead ring bonding cord winding apparatus of the prior art, the bonding cord is only spirally wound around the bead ring and the ends of the bonding cord are not processed. Thus, the wound bonding cord may become separated from the winding initiating end or the winding terminating end of the wire in the bead ring. This may displace or deform the ends.

To solve this problem, Patent Document 2 discloses a prior art example of a bead ring. In the bead ring of the prior art, a bonding cord is spirally wound around a portion of the wire including the winding initiating end and the winding terminating end. The end of the bonding cord are held between the spirally wound portion of the bonding cord and the bead ring. This limits separation of the bonding cord winding from the ends.

However, Patent Document 2 does not describe a method or an apparatus for holding the end of the bonding cord between the wound portion of the bonding cord and the bead ring.

PRIOR ART DOCUMENTS

Patent Document 1: Japanese Laid-Open Patent Publication No. 2000-355056
Patent Document 2: Japanese Patent No. 4235032

SUMMARY OF THE INVENTION

Problems that are to be Solved by the Invention

Accordingly, it is an object of the present invention to provide a bead ring bonding cord winding apparatus that can spirally wind a bonding cord around a bead ring while holding an end of the bonding cord between a wound portion of the bonding cord and the bead ring with a simple structure.

Means for Solving the Problem

To achieve the above object, one aspect of the present invention provides a bead ring bonding cord winding apparatus including a ring moving member that feeds a bead ring, which is formed by winding a wire a multiple number of times, in a circumferential direction of the bead ring, a gripping member that grips an end of a bonding cord, and a rotation member that rotates past an inner side and an outer side of the bead ring while holding the bonding cord. While the bead ring is fed in the circumferential direction, the rotation member is rotated past the inner side and the outer side of the bead ring to spirally wind the bonding cord around the bead ring. The gripping member is located at an upstream side of the rotation member in the feeding direction of the bead ring.

In the bead ring bonding cord winding apparatus of the present invention, as the ring moving member feeds the bead ring in the circumferential direction while the gripping member holds the end of the bonding cord, the rotation member, which has held the bonding cord, is rotated past the inner side and outer side of the bead ring. This spirally winds the bonding cord to the portion of the bead ring including the winding initiating end and the winding terminating end of the wire to bond the winding initiating end and the winding terminating end of the wire so that unwinding does not occur.

Here, the gripping member is located at the upstream side of the rotation member in the feeding direction of the bead ring, that is, the gripping position of the end of the bonding cord is located at the upstream side, in the feeding direction of the bead ring, of where the rotation member winds the bonding cord. Thus, if the end of the bonding cord is released from the gripping member when the bonding cord has been wound around the bead ring a multiple number of times, the bonding cord continues to be wound around the bead ring with the end of the bonding cord held between the wound portion of the bonding cord and the bead ring. In this manner, the end of the bonding cord is held between wound portion of the bonding cord and the bead ring without a special structure and just through the positional relationship between the gripping member and the rotation member. Thus, the structure of the apparatus is simplified.

In the above structure, the rotation member may include a holding member that holds the bonding cord on its circumference. Preferably, the gripping member is located at an upstream side of the holding member in the feeding direction of the bead ring.

Preferably, in the above structure, a guide member is located between the gripping member and the holding member to guide the bonding cord toward the holding member.

Effects of the Invention

As described above, the present invention succeeds in spirally winding a bonding cord around a bead ring while holding an end of the bonding cord between a wound portion of the bonding cord and the bead ring with a simple structure.

BRIEF DESCRIPTION OF THE DRAWINGS

FIG. 3 is an enlarged cross-sectional view showing a spread-out state of a gripping member, a guide member, and a holding roller in the bonding cord winding apparatus shown in FIG. 1.

MODES FOR CARRYING OUT THE INVENTION

One embodiment of a bead ring bonding cord winding apparatus according to the present invention will now be described with reference to FIGS. 1 to 5.

Figure 1:
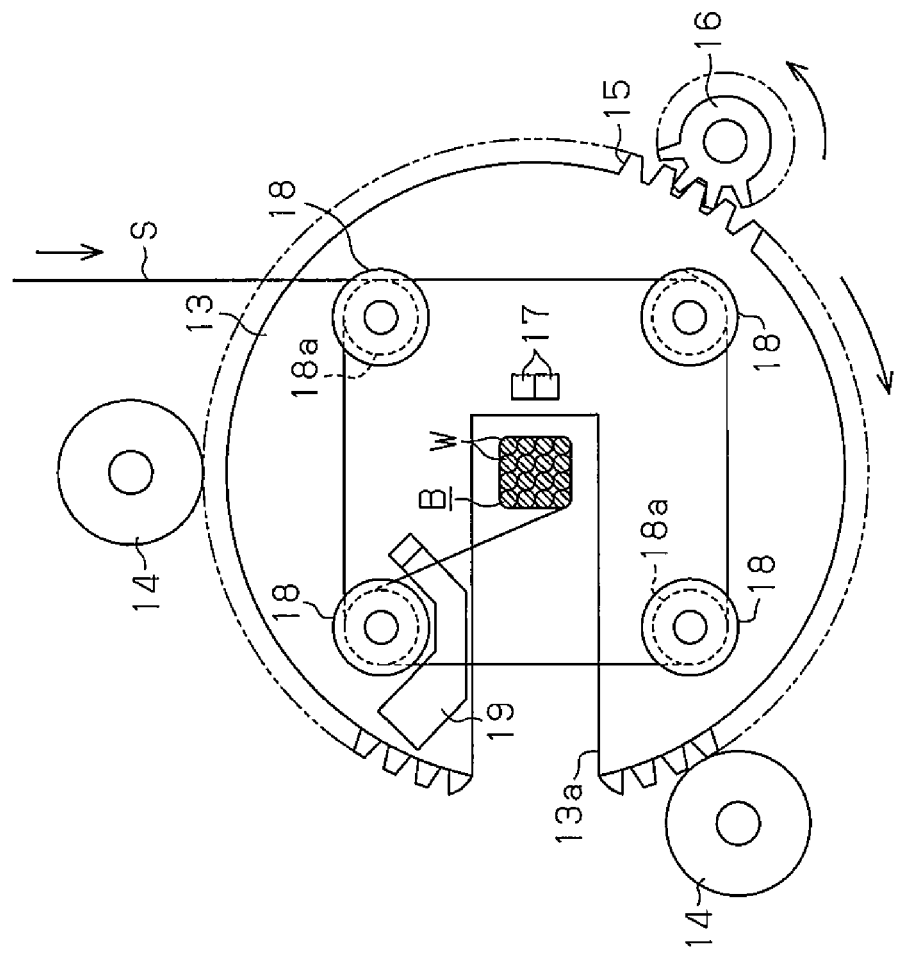
FIG. 1 is a schematic front view showing a bead ring bonding cord winding apparatus according to one embodiment of the present invention.
Figure 2B:
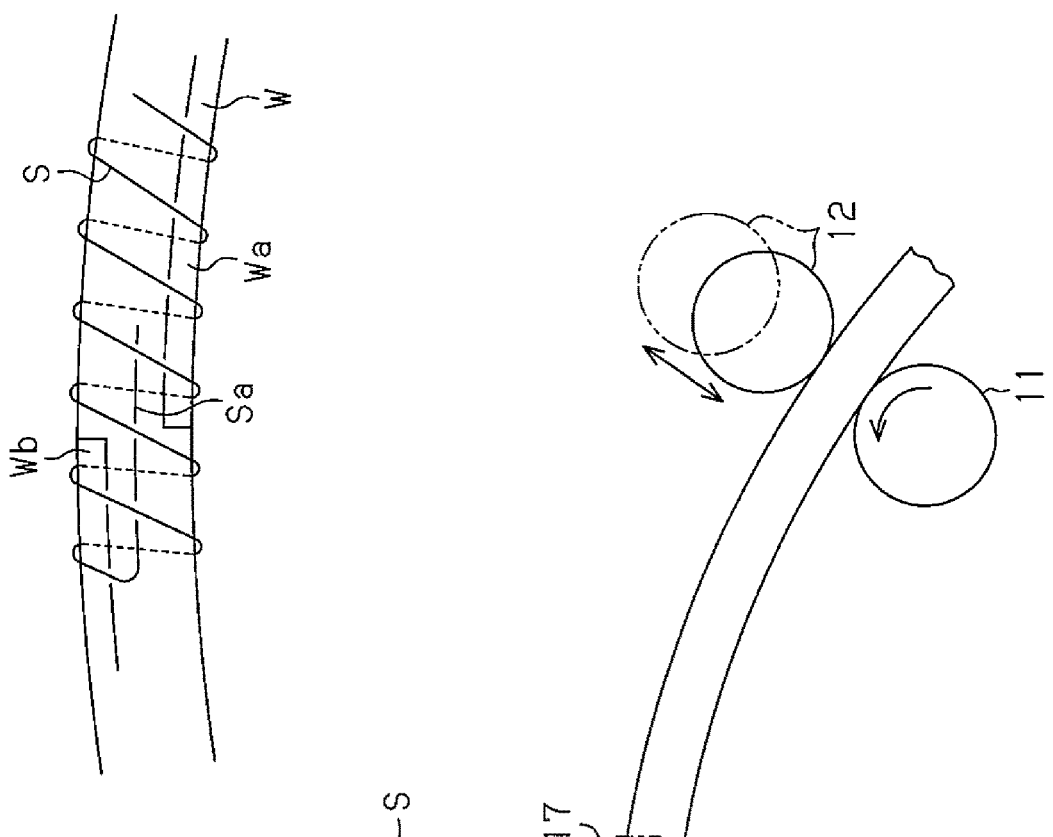
FIG. 2(b) is a simplified front view showing a bonding cord wound around a bead ring by the bonding cord winding apparatus shown in FIG. 1.
Figure 2A:
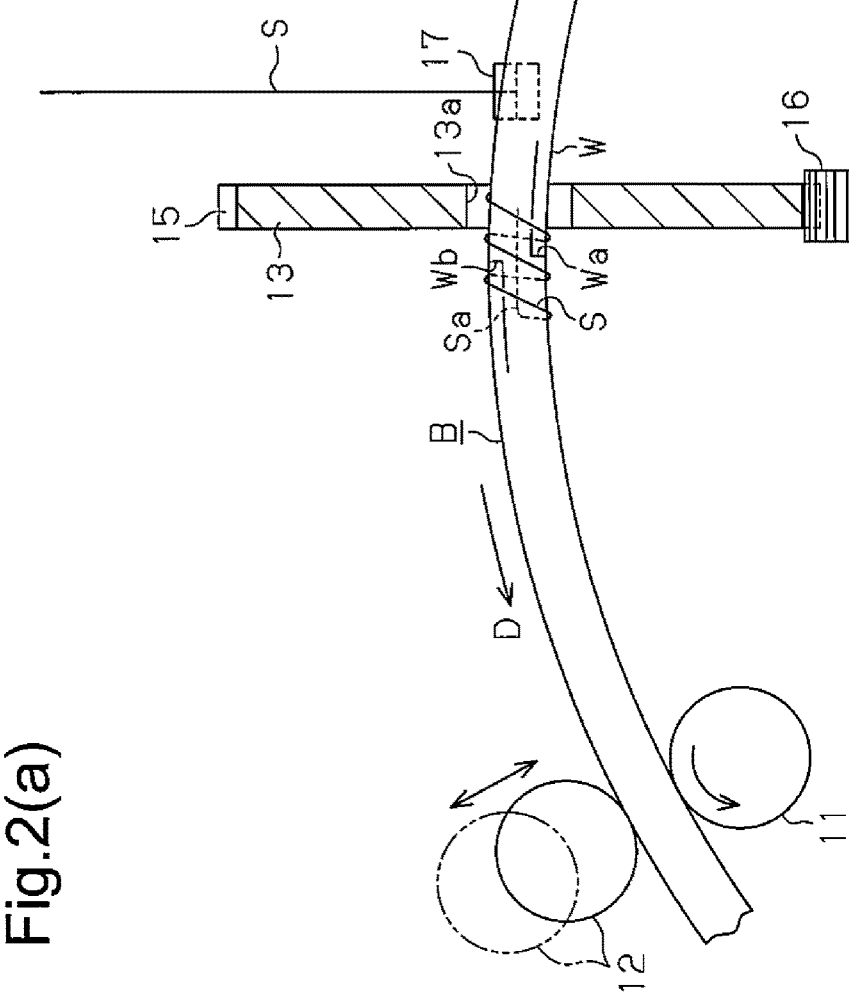
FIG. 2(a) is a vertical cross-sectional view of the bonding cord winding apparatus shown in FIG. 1.

As shown in FIGS. 1 and 2(a), the bonding cord winding apparatus of the embodiment includes two feed rollers 11 rotatably supported by an apparatus frame (not shown) and each serving as a ring moving member that feeds an annular bead ring B in its circumferential direction.

The bead ring B is formed to have a cross-sectional shape of a polygon, such as a tetragon, by winding a wire W a multiple number of times to arrange the wire W in a column direction and a row direction.

Two clamp rollers 12 are rotatably supported by the apparatus frame. Each clamp roller 12 is located in correspondence with one of the feed rollers 11 and is movable toward and away from the feed roller 11. When clamped between the feed rollers 11 and the clamp rollers 12, the bead ring B is fed in the counterclockwise direction (arrow D direction) as viewed in FIG. 2(a) by the rotation of the feed rollers 11.

As shown in FIGS. 1 and 2(a), a disk-shaped rotation member 13, which spirally winds a bonding cord S around the bead ring B, is rotatably supported on the apparatus frame by support rollers 14 that contact the circumferential surface of the rotation member 13. The rotation member 13 includes an insertion groove 13a, which extends in the radial direction of the rotation member 13. The bead ring B is inserted into the insertion groove 13a, so that the rotation member 13 traverses the bead ring B. A driven gear 15 is formed on the circumference of the rotation member 13. A driving gear 16, which is engaged with the driven gear 15, is rotatably supported by the apparatus frame. When the bead ring B is inserted into the insertion groove 13a and arranged at the center of the rotation member 13, which is in the insertion groove 13a, the driving gear 16 rotates the driven gear 15 and the rotation member 13 about its center in the clockwise direction of FIG. 1 to pass by the inner side and the outer side of the bead ring B. In other words, the rotation member 13 rotates about an axis that extends in the feeding direction D of the bead ring B.

Referring to FIGS. 1, 2(a), and 3, the apparatus frame includes a pair of gripping members 17, which grips the initiating end Sa of the bonding cord S in a releasable manner. The pair of gripping members 17 is located proximate to the rotation center of the rotation member 13 at the upstream side of the rotation member 13 in the feeding direction D of the bead ring B. When the initiating end Sa of the bonding cord S is gripped by the gripping members 17, the winding of the bonding cord S around the bead ring B is started. After the bonding cord S is wound a multiple number of times, a cylinder or the like (not shown) opens the gripping members 17 and releases the initiating end Sa of the bonding cord s from the gripping members 17.

As shown in FIGS. 1 and 3, holding rollers 18, which each serve as a holding member, are rotatably supported by the side surface of the rotation member 13. The holding rollers 18 are arranged at predetermined intervals on the same circumference, the center of which is on the rotation axis of the rotation member 13. The circumferential surface of each holding roller 18 includes a holding groove 18a that holds the bonding cord S. The holding groove 18a holds the bonding cord S at a position located at the downstream side, in the feeding direction D of the bead ring B, of where the gripping members 17 grip the initiating end Sa of the bonding cord S.

As shown in FIGS. 1 and 3, a guide member 19 is arranged on the side surface of the rotation member 13. The guide member 19 includes a sloped guide surface 19a and a restriction surface 19b. The sloped guide surface 19a guides the bonding cord S to the position where the bonding cord S is held by the holding rollers 18. The restriction surface 19b is continuous with the sloped guide surface 19a. The restriction surface 19b is located at the same position as the holding grooves 18a in the feeding direction D of the bead ring B. If the rotation member 13 is rotated when the initiating end Sa of the bonding cord S is gripped by the gripping members 17, as shown in FIG. 3, the bonding cord S moves along the sloped guide surface 19a of the guide member 19 toward the rotation member 13. Then, the restriction surface 19b restricts movement of the bonding cord S and guides the bonding cord S to where the holding rollers 18 hold the bonding cord S.

The operation of the bead ring bonding cord winding apparatus will now be described.

Figure 4:
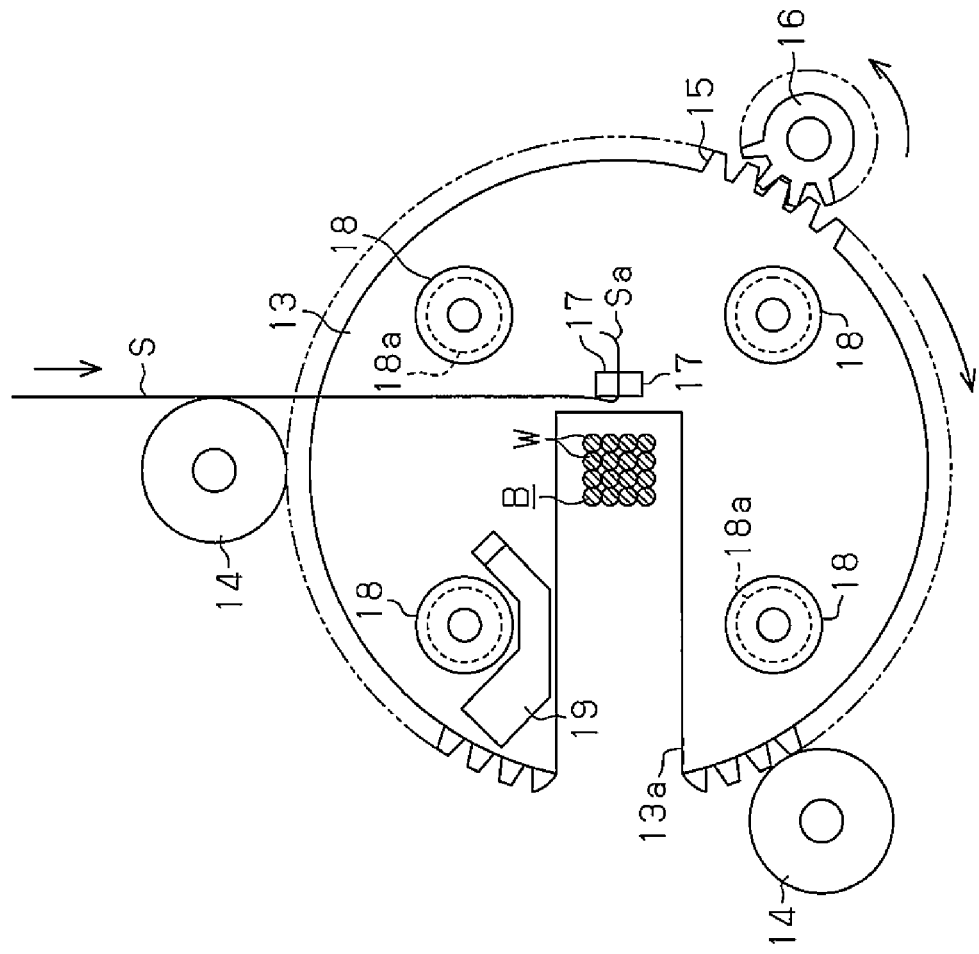
FIG. 4 is a front view of the bonding cord winding apparatus shown in FIG. 1 and illustrates an operation for winding the bonding cord around the bead ring.

When winding the bonding cord S around the bead ring B with the bead ring bonding cord winding apparatus, a supplying source (not shown) supplies the bonding cord S to the bonding cord winding apparatus. As shown in FIG. 4, the pair of gripping members 17 holds the initiating end Sa of the bonding cord S. Then, the bead ring B is inserted into the insertion groove 13a of the rotation member 13. As shown in FIG. 2, the feed rollers 11 and the clamp rollers 12 clamp the two sides of the portion of the bead ring B including the winding initiating end Wa and the winding terminating end Wb of the wire W.

In this situation, when the rotation member 13 is rotated in the clockwise direction as viewed in FIG. 4, the bonding cord S contacts the sloped guide surface 19a of the guide member 19 and moves along the sloped guide surface 19a toward the rotation member 13. Then, the bonding cord S contacts the restriction surface 19b of the guide member 19, and the restriction surface 19b restricts movement of the bonding cord S. This guides the bonding cord S to where the holding rollers 18 hold the bonding cord S.

Figure 5:
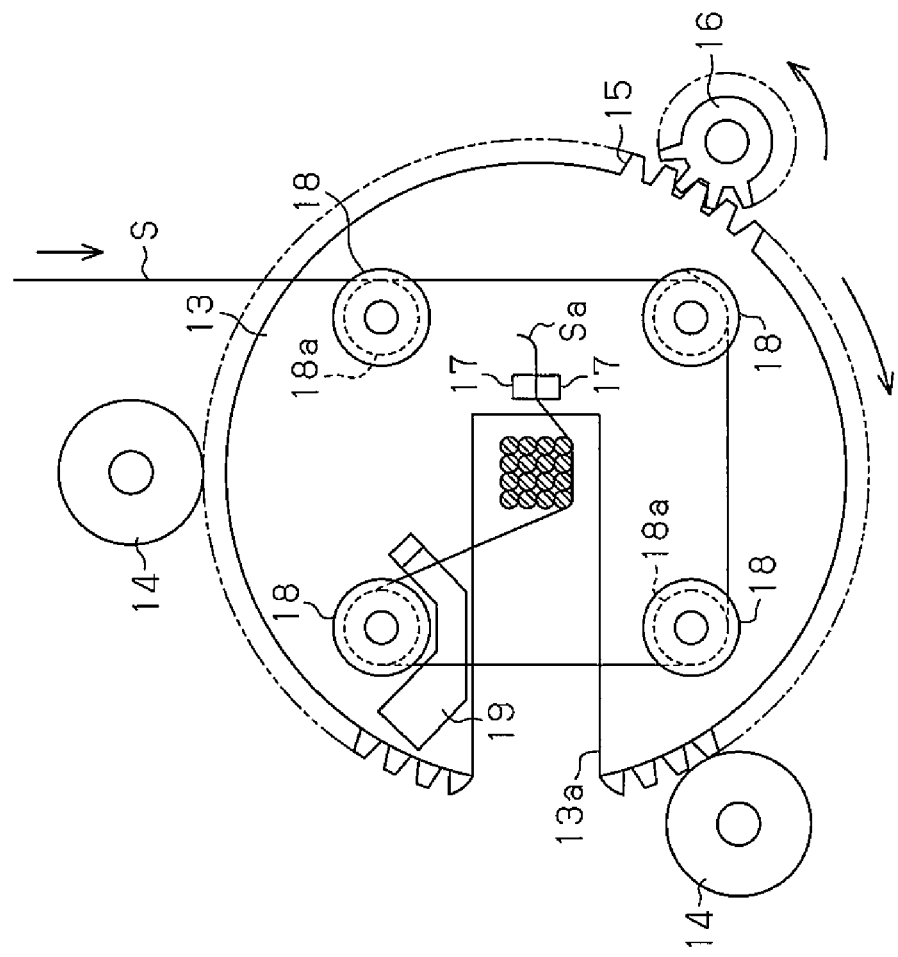
FIG. 5 is a front view of the bonding cord winding apparatus shown in FIG. 1 and illustrates the operation for winding the bonding cord around the bead ring.

The feed rollers 11 are rotated at the same time as when the rotation member 13 is rotated to feed the bead ring B in the counterclockwise direction as viewed in FIG. 2 and start winding the bonding cord S around the bead ring B as shown in FIG. 5. When the rotation member 13 is rotated two to four times, as shown in FIG. 1, a cylinder or the like (not shown) opens the gripping members 17 and releases the initiating end Sa of the bonding cord S from the gripping members 17. In this case, as shown in FIGS. 2(a) and 2(b), the gripping members 17 are located at the downstream side of the rotation member 13 in the feeding direction D of the bead ring B. Thus, the initiating end Sa of the bonding cord S released from the gripping members 17 is pulled toward the bead ring B and drawn into the wound portion of the bonding cord S by the feeding movement of the bead ring B.

As the rotation member 13 rotates (e.g., ten times) and the supplied length of the bonding cord S reaches a predetermined value, the bonding cord S is cut by a cutting member (not shown). Then, further rotation of the rotation member 13 winds the bonding cord S up to the terminating end (cut end) around the bead ring B. This bonds the winding initiating end Wa and the winding terminating end Wb of the wire W so that unwinding does not occur. Then, the rotation of the rotation member 13 is stopped, and the feeding movement of the bead ring B is stopped. Further, the feed rollers 11 and the clamp rollers 12 unclamp the bead ring B. This completes the winding operation of the bonding cord S. The tension produced by the rotation of the rotation member pushes the terminating end of the bonding cord S against the circumferential surface of the bead ring B. Thus, there is no need to draw the terminating end of the boding cord S into the wound portion of the bonding cord S.

The present embodiment has the advantages described below.

(1) In the bead ring bonding cord winding apparatus, the gripping members 17, which grips the initiating end Sa of the bonding cord S, are located at the upstream side of the rotation member 13, which rotates past the inner side and the outer side of the bead ring B while holding the bonding cord S, in the feeding direction D of the bead ring B. During operation of the bonding cord winding apparatus, while the gripping members 17 grip the initiating end Sa of the bonding cord S, the bead ring B is fed in its circumferential direction, and the rotation member 13, which has held the bonding cord S, is rotated past the inner side and the outer side of the bead ring B. This spirally winds the bonding cord S around the portion of the bead ring B including the winding initiating end Wa and the winding terminating end Wb of the wire W, and bonds the winding initiating end Wa and the winding terminating end Wb of the wire W so that unwinding does not occur.

Here, the gripping position of the initiating end Sa of the bonding cord S is located at the upstream side, in the feeding direction D of the bead ring B, of where the rotation member 13 winds the bonding cord S. Thus, if the initiating end Sa of the bonding cord S is released from the gripping members 17 when the bonding cord S has been wound around the bead ring B a multiple number of times, the bonding cord S continues to be wound around the bead ring B with the initiating end Sa of the bonding cord S held between the wound portion of the bonding cord S and the bead ring B.

In this manner, the initiating end Sa of the bonding cord S is held between the wound portion of the bonding cord S and the bead ring B without a special structure and just through the positional relationship between the gripping members 17 and the rotation member 13. Thus, the structure of the apparatus is simplified.

(2) In the bead ring bonding cord winding apparatus, the holding rollers 18, which hold the bonding cord S, and the guide member 19, which guides the bonding cord S to where the holding rollers 18 hold the bonding cord S, are located on the rotation member 13. Thus, even though the position where the holding rollers 18 hold the bonding cord S differs from the position where the gripping members 17 grip the initiating end of the bonding cord S in the feeding direction D, the guide member 19 acts to smoothly guide the bonding cord S to the holding positions on the holding rollers 18.

Modified Examples

The present embodiment may be modified as described below.

The number of the holding rollers 18 may be changed to three or five or more.

In lieu of the guide member 19, a guide roller may be located at an intermediate position in the feeding direction D of the bead ring B between the position where the holding rollers 18 hold the bonding cord S and the position where the gripping members 17 grip the initiating end Sa of the bonding cord S.

In lieu of the holding rollers 18, holding members, such as pins and plates, made of a material having a low coefficient of friction may be used.

DESCRIPTION OF THE REFERENCE CHARACTERS

11: feed roller serving as ring moving member, 13: rotation member, 17: gripping member, 18: holding roller, 18a: holding groove, 19: guide member, 19a: sloped guide surface, 19b: restriction surface, B: bead ring, W: wire, Wa: winding initiating end, Wb: winding terminating end, S: bonding cord, Sa: initiating end, D: feeding direction.

What I claim is:

1. An apparatus adapted to spirally wind a bonding cord around a bead ring such that a spirally wound portion of the bonding cord is wound about an initiating end of the bonding cord to hold the initiating end of the bonding cord between the spirally wound portion of the bonding cord and the bead ring, the bead ring being formed of a wire having a winding initiating end and a winding terminating end, the apparatus comprising:
   feed rollers engaging the bead ring to rotate the bead ring in a feeding direction;
   a rotation member that rotates about the bead ring;
   holding rollers that hold the bonding cord, the holding rollers being mounted on the rotation member and moving with the rotation member to rotate about the bead ring;
   a guide that guides the bonding cord into engagement with the holding rollers as the rotation member rotates about the bead ring, the guide guiding the bonding cord prior to the bonding cord engaging the holding rollers, the guide being mounted on the rotation member and moving with the rotation member to rotate about the bead ring; and
   a gripper that grips the initiating end of the bonding cord, the gripper being located upstream of the rotation member and the holding rollers along the feeding direction of rotation of the bead ring such that the spirally wound portion of the bonding cord is wound about the initiating end of the bonding cord, the feeding direction being a direction in which the winding initiating end of the wire passes the gripper before passing the rotation member.

\* \* \* \* \*